United States Patent [19]

Divers

[11] 4,295,260

[45] Oct. 20, 1981

[54] TOOL FOR REMOVING SLEEVES FROM CYLINDERS

[76] Inventor: Robert M. Divers, 9119 Clydesdale Dr., St. Louis, Mo. 63126

[21] Appl. No.: 84,617

[22] Filed: Oct. 15, 1979

[51] Int. Cl.³ .............................................. B23P 19/00

[52] U.S. Cl. ...................................... 29/426.5; 29/234; 29/263

[58] Field of Search ................. 29/234, 237, 263, 264, 29/280, 281, 275, 426.5

[56] References Cited

U.S. PATENT DOCUMENTS

| | | | |
|---|---|---|---|
| 689,742 | 12/1901 | Newman | 29/280 |
| 2,641,831 | 6/1953 | Hilton | 29/255 |
| 2,775,025 | 12/1956 | Williams | 29/275 |
| 3,662,451 | 5/1972 | Wagner | 29/263 |
| 3,945,104 | 3/1976 | Brookover | 29/255 |

*Primary Examiner*—James L. Jones, Jr.
*Attorney, Agent, or Firm*—Glenn K. Robbins

[57] ABSTRACT

A tool for removing sleeves from cylinders having an unrestricted opening at one end and a restricted opening at the other end. A stabilizer or guide rod device having a disc with a diameter closely approaching the internal diameter of the sleeve is placed adjacent a shoulder of the sleeve with a further disc used as a stabilizer within the sleeve. From the restricted opening of the cylinder housing having an internal diameter less than the diameter of the sleeve a plurality of radial or pie-shaped collar segments are inserted and placed on top of the stabilizer support disc and fitting over the shoulder of the sleeve. A pusher rod is inserted through the restricted opening of the cylinder and connected to the stabilizer support disc with apparatus for clamping the collar segments thereto. The pusher rod with the clamped collar segments extending over the shoulder of the sleeve in clamped relation is moved or pushed to force the sleeve out of frictional engagement with the cylinder and is removed therefrom.

13 Claims, 4 Drawing Figures

TOOL FOR REMOVING SLEEVES FROM CYLINDERS

SUMMARY OF THE INVENTION

In the past cylinder sleeves have been used with cylinders for one purpose or another. Such usages of removeable sleeves are conventional in cylinder housing for pumps, internal combustion engines or the like. Difficulty has long been encountered in the removal of sleeves from such cylinder housings where one end has restricted internal opening presenting a diameter less than that of the sleeve. In such situations there is a problem in removing the tightly fitted sleeves from the housing requiring a substantial amount of time, labor and expense.

By means of this invention there has been provided a tool which may be simply employed to removed sleeves from cylinder housings where the sleeve shoulder is exposed toward the end having the restricted opening of the cylinder housing. Such restricted openings may be of one type or another such as internal flange which has a lesser diameter than that of the sleeve making it impossible to use an integral tool which may bear against the sleeve shoulder because of the impossibility of insertion because of the blocking presented by the restricted opening.

Through this invention there has been provided a sleeve removal tool employing a stabilizer rod which may be inserted into a sleeve from the unrestricted opening. The stabilizer rod is provided with a disc closely approaching the internal diameter of the sleeve and which is used as a support at the end of the sleeve having an exposed shoulder. A stabilizer disc or guide disc is connected to the stabilizer rod a short distance from the support disc to stabilize the stabilizer rod and keep the support disc stable and prevent it from tilting.

In order to provide a bearing support on the shoulder of the sleeve, a plurality of radial or pieshaped collar segments may be inserted through the restricted opening end of the cylinder housing and regrouped to form a circular bearing collar which rests upon the exposed shoulder portion of the sleeve. Such shoulder portions may be square, chamferred, bevelled or the like. The overlying relationship of the collar segments provide a bearing means for the sleeve. A pusher rod is inserted through the restricted opening, connected to the stabilizer rod and tightened to clamp the radial collar segments against the support disc stabilizer.

When so connected the pusher rod is manually moved toward the unrestricted opening with the collar segments bearing against the shoulder of the sleeve to force the sleeve from the cylinder. The tool of this invention may be simply employed for various types of cylinder sleeves having a restricted opening.

By means of openings in the face of the collar segment they can be grasped by needle-nose pliers or other types of tool. The segments are inserted through the restricted opening of the cylinder and grasped upon the stabilizer support disc which acts as an anvil or mandrel. The stabilizer rod may have a protruding threaded end extending beyond the support disc around which the collar segments may be placed. This end of the stabilizer rod acts as a guide and also as a means for receiving a threaded tapped or internal opening in the end of the pusher rod whereby the pusher rod may be caused to clamp the collar segments between the pusher rod and the support disc.

The tool may be employed without any special training by unskilled workmen in a wide variety of usages where cylinder sleeves are to be removed from a cylinder housing having a restricted opening.

The above features are objects of this invention and various other objects will appear in the detailed description which follows and will be otherwise apparent to those skilled in the art.

For the purpose of illustration of this invention there is shown in the accompanying drawings a preferred embodiment thereof. It is to be understood that the drawings are for the purpose of example only and that the invention is not limited thereto.

IN THE DRAWINGS

SUMMARY OF THE INVENTION

Figure 1:
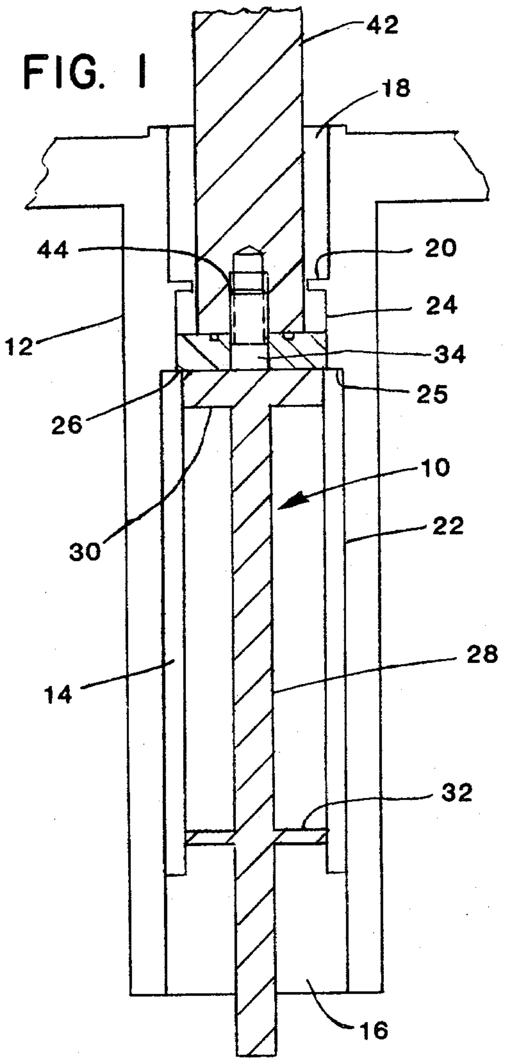
FIG. 1, is a view in axial section of a cylinder housing and sleeve showing the connected tool.

The tool of this invention is generally designated by the reference numeral 10 in FIG. 1. It is shown in use in a cylinder housing 12 provided with an internal sleeve 14. The tool is shown used in a cylinder having an unrestricted opening 16 from which sleeve 14 must be removed. The restricted opening 18 is shown at the top, such restriction being presented by an internal flange 20 which has an internal diameter less than that of the sleeve making the insertion of a pusher tool of a diameter large enough to bear against the end of the sleeve impossible from this end.

The lower cylinder internal wall 22 has a diameter slightly greater than the upper wall portion 24 presenting a shoulder 25 against which the upper end of the sleeve bears. The sleeve has a protruding shoulder 26 which extends inwardly of the cylinder wall 24 which makes it possible by the bearing relationship the tool to seat against it when the collar segments are inserted as will be more described herein below.

The tool is generally comprised of a stabilizer rod 28 which supports at the top a stabilizer disc support 30. This support has a diameter slightly less than the internal diameter of the sleeve 14. A stabilizer disc 32 is connected to the rod and spaced from the support disc 30 in order that it may serve as a guide to stabilize the stabilizer rod when it is inserted in the sleeve. The support disc is positioned adjacent the sleeve shoulder 26 so that it may serve as an anvil or mandrel when the collar segments as described are placed upon the support disc.

The stabilizer rod is further provided with a protruding end 34 which is threaded and serves a dual function to act as a guide for the collar segments when they are placed thereupon and also to serve as a means for connecting the pusher rod.

Figure 2:
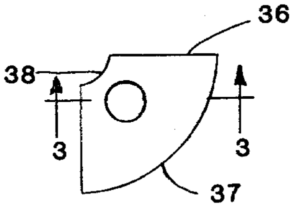
FIG. 2, is an enlarged plan view of a collar segment.
Figure 3:
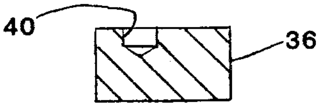
FIG. 3, is a view in section taken on the line 3—3 of FIG. 2.
Figure 4:
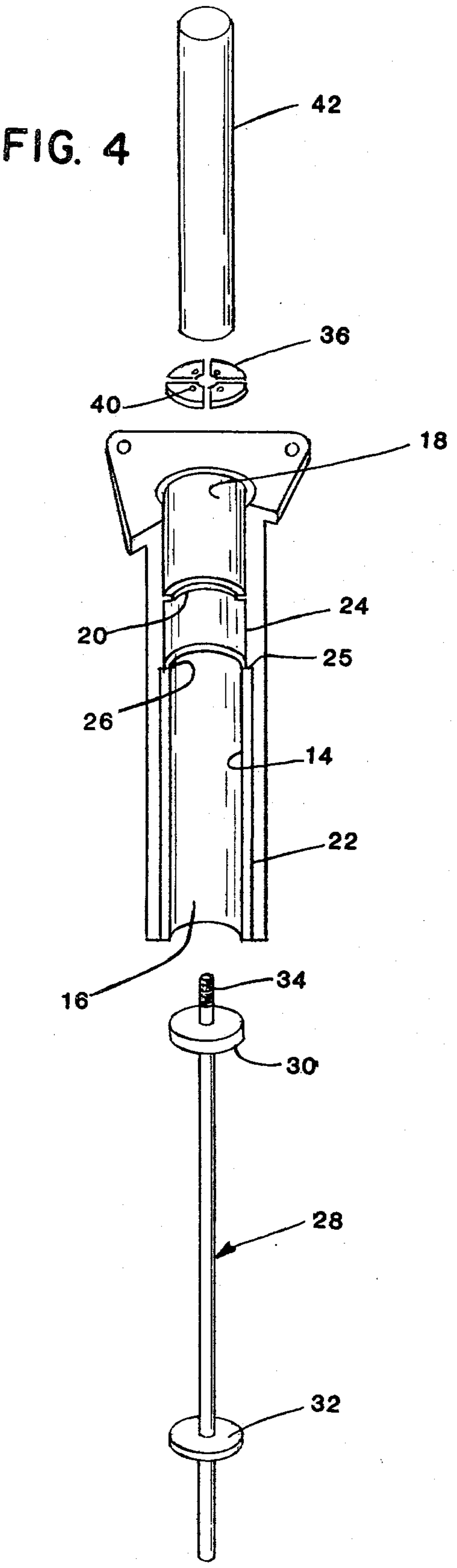
FIG. 4, is an exploded pictorial view showing in section the cylinder housing and showing the tool in full body before insertion.

The collar segments are best shown in FIGS. 2 and 3, and for the purpose of example are shown in quarter segments. They are designated by the reference numeral 36 and have an outer arcuate convex side 37 and a concave inner side 38 adopted to fit around the threaded end 34 of the stabilizer rod. A drilled or tapped opening 40 is formed at the top of the collar segment in order that it may be grasped by needle-nose pliers or other tool and placed through the restricted opening of the cylinder upon the support disc 30 and then grouped to form a circular collar upon the support disc. The collar segments are of an external diameter approaching the internal diameter of the wall 24 of the cylinder housing in order that they may fit closely therein and seat upon the inwardly protruding shoulder 26 of the sleeve and bear against it.

The pusher rod employed in this invention is designated by the reference numeral 42. It is of a diameter slightly less than the internal diameter of the restricting flange 20 of the cylinder housing and extends over a portion of the collar segments. It has an internally threaded opening 44. The pusher rod is inserted through the restricted opening of the cylinder housing and connected to the end 34 of the stabilizer rod and tightened to clamp the collar segments to the support disc of the stabilizer rod.

USE

The use of the tool is simply executed. To remove the sleeve from the cylinder housing the stabilizer rod is inserted to the position shown in FIG. 1. In this position the support stabilizer disc 30 is situated about even with the shoulder 26 of the cylinder sleeve.

In the next step the workman grasps one of the collar segments 36 with a pair of needle-nose pliers by grasping with the jaws of the pliers the opening 40 at the top face of the collar segment and inserting it through the restricted opening of the cylinder and placing the collar segment on top of the stabilizer disc to a position where it seats flat with the inner concave surface 38 adjacent the end 34 of the stabilizer rod. The second, third and fourth of the quarter sections of the collar segments are then inserted in a like fashion to present a cicular collar fitting on top of the stabilizer support disc and bearing on top of the shoulder section of the sleeve.

In the next stage of operation, the pusher rod is inserted through the restricted opening and connected by threading it to the end 34 of the stabilizer rod. The pusher rod is tightened to clamp the collar segments against the support disc 30 of the stabilizer rod.

In the last stage of operation with the tool firmly clamped together as described the sleeve is simply pushed with the pusher rod to remove the cylinder sleeve through the unrestricted opening of the cylinder housing. The pushing may be effected either by a pushing operation on top of the pusher rod or by application of any type or force as required. By this invention the cylinder sleeve may be simply removed in a minimum of time and expenditure. The sleeves when removed are not damaged nor is the cylinder housing adversely affected.

Various changes and modifications may be made within this invention as will be readily apparent to those skilled in the art. Such changes and modifications are within the scope and teaching of this invention as defined by the claims appended hereto.

What is claimed is:

1. A tool for removing a sleeve from a cylinder housing having a restricted opening at one end and an unrestricted opening at an opposite end and said sleeve having a shoulder protruding inwardly of said housing, said tool comprising a guide means insertable into said sleeve from said unrestricted opening of the cylinder and radial collar segments individually insertable upon said guide means from said restricted opening of the cylinder and forming a disc-shaped circular collar fitting over said shoulder of the sleeve and pusher rod means insertable through said restricted opening, said pusher rod being provided with means for connecting it to said guide means and clamping said collar segments thereto, said pusher rod being forcefully movable toward said unrestricted opening of the cylinder with the clamped collar segments bearing against the sleeve to force it out of the cylinder housing, said guide means being comprised of a rod-like member having a disc member closely receivable within said sleeve and adapted to support said collar segments in clamped relation.

2. The tool of claim 1, in which said guide rod has a threaded end adjacent said disc member and said pusher rod has an internally threaded end engageable with the threaded end of said guide rod member.

3. The tool of claim 1, in which the collar segments have an arcuate inner end surface closely mating with the threaded end of said guide rod when they are fitted on the stabilizer support disc.

4. The tool of claim 1, in which the collar segments have a top surface having an opening receiving a tool whereby they may be grasped and fitted through said restricted opening upon said support disc.

5. The tool of claim 1, in which said rod-like member is provided with a stabilizer disc spaced from said support disc, both of said discs having an internal diameter of a size to provide a close fit within said sleeve to provide stability.

6. The tool of claim 2, in which said pusher rod has an external diameter of a sufficient size to fit within said restricted opening and extend over said collar segments and firmly clamp them to said support disc of the stabilizer rod when said pusher rod is tightened against the end of said stabilizer rod.

7. A method for removing a sleeve from a cylinder having a restricted opening at one end and an unrestricted opening at the other end which comprises inserting a tool provided with guide means into said sleeve from said unrestricted opening of the cylinder, inserting a plurality of radial collar segments from said restricted opening of the cylinder and forming a disc-shaped circular collar fitting over a shoulder of the sleeve, inserting a pusher rod means through said restricted opening, connecting the pusher rod means to said guide means and clamping the collar segments thereto, forcefully moving the pusher rod means toward said unrestricted opening of the cylinder with the clamped collar segments bearing against the sleeve to force it out of the cylinder housing.

8. The method of claim 7, in which the guide means is comprised of a rod-like member having a support disc member closely receivable within said sleeve and said collar segments are individually placed upon said disc member and grouped together to form said disc-shaped circular collar.

9. The method of claim 8, in which said guide rod has a threaded end adjacent said support disc member and said pusher rod has a mating threaded end and both of said ends are engaged with one another.

10. The method of claim 9, in which the collar segments have an arcuate inner surface and are closely mated with the threaded end of said guide rod when they are fitted upon said support disc.

11. The method of claim 8, in which said collar segments are grasped at a top surface means and are fitted through said restricted opening upon said support disc in underlying relation to said restricted opening.

12. The method of claim 8, in which said rod-like member is provided with a stabilizer disc spaced from said support disc and both of said discs have an internal diameter closely fitting within said sleeve to provide stability.

13. The method of claim 9, in which said pusher rod has an external diameter of a sufficient size to fit within said restricted opening and extend over said collar segments and said pusher rod is employed to clamp firmly said collar segments upon said support disc of the stabilizer rod when said aforementioned rods are engaged with one another.

* * * * *